US006496681B1

(12) United States Patent
Linton

(10) Patent No.: US 6,496,681 B1
(45) Date of Patent: *Dec. 17, 2002

(54) METHOD AND SYSTEM FOR ACCESSING AND INTERCHANGING MULTIMEDIA DATA IN AN INTERACTIVE FORMAT PROFESSIONAL DEVELOPMENT PLATFORM

(76) Inventor: Chet D. Linton, 94 Lone Hollow, Sandy, UT (US) 84092

( * ) Notice: Subject to any disclaimer, the term of this patent is extended or adjusted under 35 U.S.C. 154(b) by 20 days.

This patent is subject to a terminal disclaimer.

(21) Appl. No.: 09/666,648

(22) Filed: Sep. 20, 2000

Related U.S. Application Data

(63) Continuation-in-part of application No. 09/400,940, filed on Sep. 22, 1999.

(51) Int. Cl.[7] .................................................. G09B 3/00
(52) U.S. Cl. ....................... 434/350; 434/350; 434/322; 434/323
(58) Field of Search ................................ 434/350, 322, 434/323

(56) References Cited

U.S. PATENT DOCUMENTS

| 4,798,543 A | * | 1/1989 | Spiece ........................ 434/323 |
| 5,590,057 A | * | 12/1996 | Fletcher et al. ......... 702/182 X |
| 5,987,443 A | * | 11/1999 | Nichols et al. ........... 706/11 X |
| 6,039,575 A | * | 1/2000 | L'Allier et al. ......... 434/323 X |
| 6,099,320 A | * | 8/2000 | Papadopoulos ......... 434/322 X |
| 6,149,441 A | * | 11/2000 | Pellegrino et al. ...... 434/350 X |
| 6,155,840 A | * | 12/2000 | Sallette .................... 434/323 X |
| 6,282,404 B1 | * | 8/2001 | Linton .................... 434/350 X |
| 6,190,178 B1 | * | 1/2002 | Oh .......................... 434/323 X |

* cited by examiner

Primary Examiner—Joe H. Cheng
Assistant Examiner—Chanda Harris
(74) Attorney, Agent, or Firm—Kirton & McConkie; Michael F. Krieger

(57) ABSTRACT

A method and system for assessing educator/student skills, managing the teaching, evaluating, verifying, and reporting of an instructional segment to a given user accessing the instructional segment via a computer system are disclosed. The system for skills assessment and knowledge, managing the instructional segment and providing the verification, evaluation, teaching, and reporting of the user's activity with the instructional segment is implemented within a computer system, typically a network connected system that has access to the Internet. The managing system includes means for streaming or broadcasting the instructional segment to the user for review by the user, means for evaluating the user's comprehension of the instructional segment, means for verifying whether the user has completed or accessed the instructional segment, and means for reporting the user's evaluation results of the instructional segment to an administrator or administrators. Further included are means for granting the user access to the instructional segment via a user handle and a private password that are corroborated by the database system during the user accessing the instructional segment.

39 Claims, 20 Drawing Sheets

Questions Segment 2

Name:

District/School:

1. Think of the Cocktail Party Effect. Name a time when at least two ideas were simultaneously communicated to your students leaving them confused.

2. Think of a difficult concept you must teach your students. What could you connect that concept to that is already in their minds.

3. Think of another difficult concept you must teach. Find a pattern in that concept that would help your students comprehend it.

4. What is something you learned as a child that had an emotional hook?

Edit School

Address http://166.70.8.244/cfsinet/editSchool.cfm?id=2

School ID: 2

Description: Kearns High

District ID: Granite

School Type: High School

Verifier ID: 0

Program Administrator: 0

Last Update User: cort.

Last Update: 1999-08-03 16:50:00

| Department | # Educators Assigned |
|---|---|
| X Science | 1 |
| X Math | 0 |
| X English | 0 |

1626

English

Contact Title  Contact Name
No contacts

Chet Linton

Add Department

Update — 1524

School belongs to zone: another zone

1628

Change Zone    Add Contact

Show Educators

File  Edit  View  Favorites  Tools  Help

Address  http://166.70.8.244/cfsinet/showeducators.cfm

Menu
Logout

SCHOOL
IMPROVMENT
.NET

Add New  A B C D E F G H I J K L M N O P Q R S T U V W X Y Z

| UserName | LastName | FirstName | Active | Email | UserType | LastLogin | LoginCount |
|---|---|---|---|---|---|---|---|
| Teacher | | | Yes | | Teacher | 1999-08-25 11:06:00 | 7 |
| × Ken | Berry | Ken | Yes | kenb@visicon.net | Verifier | 1999-08-27 10:39:00 | 2 |
| × joe@someplace.com | Blow | Joe | Yes | joe@somplace.com | Admin | | 0 |
| × Chet | Linton | Chet | Yes | chet@videojournal.com | Admin | 1999-09-02 11:52:00 | 4 |
| × Cort | Schaefer | Cort | Yes | cort@xmission.com | Admin | 1999-09-02 11:58:00 | 110 |
| × Verifier | Verifer | Verifier | Yes | verifier@schoolimprovement.net | Admin | 1980-01-01 00:00:00 | 1 |

— 1710

Done                    Internet

Report By Zone
Report Date: 8/19/99
Search Dates: 8/1/1999 - 8/20/99
Granite District

| Zone | School | Licenced Collections | Segments Licenced | Grand Total Segments | Segments Viewed | Assignments Completed | Participation Percentage | Licenced per building |
|---|---|---|---|---|---|---|---|---|
| Zone 1 | Taylorsville High | Brain and Standards | 55 | 5500 | 150 | 80 | 17% | 101 |
| | Smith Junior | Brain and Standards | 55 | 3150 | 725 | 600 | 23% | 57 |
| | Kennedy Junior | Brain and Standards | 55 | 3575 | 170 | 166 | 5% | 65 |
| | Mountain Middle | Brain and Standards | 55 | 3465 | 1975 | 1800 | 57% | 63 |
| | Sunbrook Elementary | Brain and Standards | 55 | 1925 | 1502 | 1495 | 78% | 35 |
| | Plato Elementary | Brain and Standards | 55 | 1540 | 340 | 330 | 22% | 28 |
| | Sharon Elementary | Brain and Standards | 55 | 1485 | 45 | 40 | 3% | 27 |
| | Edgemont Elementary | Brain and Standards | 55 | 1595 | 686 | 686 | 43% | 29 |
| | Washington Elementary | Brain and Standards | 55 | 1815 | 328 | 301 | 18% | 33 |
| | Sandy Elementary | Brain and Standards | 55 | 1485 | 1321 | 1318 | 89% | 27 |
| Total | | | 550 | 25535 | 7242 | 6816 | 53% | 465 |

FIG. 19

METHOD AND SYSTEM FOR ACCESSING AND INTERCHANGING MULTIMEDIA DATA IN AN INTERACTIVE FORMAT PROFESSIONAL DEVELOPMENT PLATFORM

RELATED PATENT APPLICATIONS

The present patent application is a Continuation-In-Part to commonly assigned U.S. patent application Ser. No. 09/400,940, filed Sep. 22, 1999, herein incorporated by reference for all purposes.

BACKGROUND OF THE INVENTION

The present invention relates generally to multimedia data distribution via computer links and, more particularly, to interactive multimedia data events with recording and reporting capabilities in a computer-linked arrangement. More particularly still, the present invention relates to the ability to provide, modify, or interchange multimedia data to a computer user in an interactive learning mode and provide a report of the user's activity level during a multimedia presentation session. The user is credited for reviewing and gaining proficiency in the session subject.

Computers have become pervasive in all aspects of the business and educational worlds. Computers allow for the generation, storage, retrieval, and interaction with data in useful ways. For example, business uses allow for large amounts of data to be correlated together in the form of databases or spread sheets that allow a user to categorize and view relationships more rapid than was previously possible without the aid of the computer.

Computers have also allowed for the dissemination of information either to limited groups or to large audiences via such communication channels as local area networks (LANs), wide area networks (WANs), and the Internet. Within this transmission of information, multimedia presentations have expanded to broaden the information dissemination and educational opportunities available over LANs, WANs, and the Internet.

The multimedia capabilities of today allow for students or interested persons to view information at their own pace, without needing to attend a class in the traditional sense of a teacher directly teaching students in a classroom setting. A teacher can now video tape a lecture and place it on a communications server so that students can access the lecture according their own schedule. The computer system also provides interactive participation with the lecture so the student, after the lecture has been presented, or at any time during the presentation of the lecture, may pause and reflect upon the subject matter presented in the lecture. This is done by providing a brief question and answer session to gauge the student's understanding. The student can view his or her results and review the lecture to fill in the gaps of information lacking during the evaluation.

Unfortunately, what has been lacking is the ability to obtain information from various users of the education system and report that information back to a supervisor, such as an instructor (such as a teacher or professor), principal, administrator, or employer of the users in a meaningful and helpful manner for evaluation or review of the user's understanding of the subject matter. For example, educational systems require that teachers continue to improve their teachings skills and understanding of information taught by them in their classrooms. The ability to view a lecture and then evaluate on their own their understanding of the material presented in the lecture is helpful to the teacher, but does not convey to the teacher's supervisor what level of understanding the teacher has obtained. Further, the supervisor of the user would also be interested in knowing more about how long the user took to review the information, how the user performed in the evaluation, what level of interaction did the user have with the lecture presented, how the collective group or groups of educators are doing, and so forth.

The Internet has provided interactivity where an Internet user is able to browse among various web sites for information. Upon finding a site of interest to the user, that site at times is able to glean information from the user that would be helpful for the web provider in a commercial or social context. For example, a user may visit a commercial site that sells widgets. The widget provider questions the user about what the user's needs are in order for the widget provider to best serve the needs of its clientele. This information is reported back to the widget provider so the widget provider can provide the best commercial site possible based on the needs of its clients.

Likewise, in a social setting, an advocacy group may provide a web site that invites all to view its positions. The advocacy web site may also solicit input from those that view its web site in order to find out the views and values of those visiting to refine its approach in achieving its goals. Both of these situations are different from the training or educational situation previously described in that the individual providing feedback to the commercial or social sites is not directly associated with the organization, nor is the user being evaluated for comprehension and learning of the disclosed subject matter.

Instructors often need to evaluate the level of understanding or the skills of the participants in the class or program. Without knowing the level of understanding or abilities of the participants, the instructor cannot gauge in advance whether the information to be presented is adequate for the participants. Thus, the instructor must assess the knowledge and skills of the participants prior to actually implementing an instructional or training program so that the program will best suit the needs and level of those participants.

Accordingly, what is needed is an interactive process that allows for educational and professional development via a computer system coupled to an Internet channel that allows an end user to view a presentation, be evaluated on the understanding gained by the user after the presentation, and reporting the results of the user's activity and evaluation to a supervisor that uses that data to verify, evaluate, and enhance educational or teacher development, which data can also be used for professional development credit or even college credit. Further still, what is needed is the ability to assess the knowledge and skills of particular participants within a program and customize the content to be provided to those participants in a seamless manner. Further still, what is needed is the ability to provide participant summary data from institutions, feeder zones, areas, districts, regions, or state levels in the evaluation of educational and teacher development.

SUMMARY OF THE INVENTION

According to the present invention, a method and system for assessing educator/student skills, managing the teaching, evaluating, verifying, and reporting of an instructional segment to a given user accessing the instructional segment via a computer system are disclosed. The system for skills assessment and knowledge, managing the instructional segment and providing the verification, evaluation, teaching, and reporting of the user's activity with the instructional segment is implemented within a computer system, typically a network connected system that has access to the Internet. The managing system includes means for streaming or broadcasting the instructional segment to the user for review by the user, means for evaluating the user's comprehension of the instructional segment, means for verifying whether the user has completed or accessed the instructional segment, and means for reporting the user's evaluation results of the instructional segment to an administrator or administrators. Further included are means for granting the user access to the instructional segment via a user handle and a private password that are corroborated by the database system during the user accessing the instructional segment.

The streaming means comprise an electronic data communications channel connected to the user with the computer system. As previously stated, this electronic data communications channel can include a local area network connection, a wide area network connection, or an internet connection that can access such networks as the World Wide Web. The internet connection can be via a LAN connection or direct dial. The reporting means includes a database for organizing, storing and retrieving the results of an evaluation performed by the user. The evaluation means electronically generates an exam to be taken by the user and records the results of that evaluation for subsequent review. The reporting means is further capable of reporting the length of time required by the user to complete the evaluation, which is helpful in evaluating how quickly the user assimilates the reviewed materials. The report also includes the results of the evaluation, which may be reported back to the user for the user's own understanding of his or her grasp of the subject matter.

The reporting means further reports whether the user completed the evaluation and how much of the evaluation has been completed, which instructional segment has been reviewed by the user, as well as whether the user completed the evaluation on the date the user viewed the segment materials. Where activities or projects are required to be performed within the instructional segment, the system can also verify completion of such activities or projects. The report can further include the date and time of the evaluation, the I.P. address of the machine on which the user reviewed the materials, whether the activity and response has been verified and when verified, and whether any response or feedback has been sent to the user. This response can be via email or posted on the network accessed by the user using the login and password scheme described earlier. The responses from the users participating in reviewing the sessions can be reviewed real time as the information is provided across the communications link, or it may be saved for offline review and evaluation by the instructional supervisor.

The method for managing at least one instructional segment to be accessed by a user for providing a teaching, evaluation, and reporting program of that management operation. The method includes streaming the instructional segment to the user for review by the user, evaluating the user's comprehension of the instructional segment, and reporting the user's evaluation results of the instructional segment to an administrator. Further, the reports can be accessed and reported to varying or more than one administrative levels with specific summary data appropriate to the reviewing administrator. At the school level this can include reports to the teacher, department/grade level, school level, which can be organized into feeder zones, area/subdistricts, districts, regions, and finally, state levels.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 11 illustrates a graphical user interface of a questions screen in accordance with the present invention;

FIG. 16 illustrates a graphical user interface of a department/grade level setup screen in accordance with the present invention;

FIG. 17 illustrates a graphical user interface of a user maintenance and setup screen in accordance with the present invention;

FIG. 19 illustrates a graphical user interface of a sample feeder zone report screen in accordance with the present invention.

DETAILED DESCRIPTION OF SPECIFIC EMBODIMENTS THE INVENTION

Figure 1:
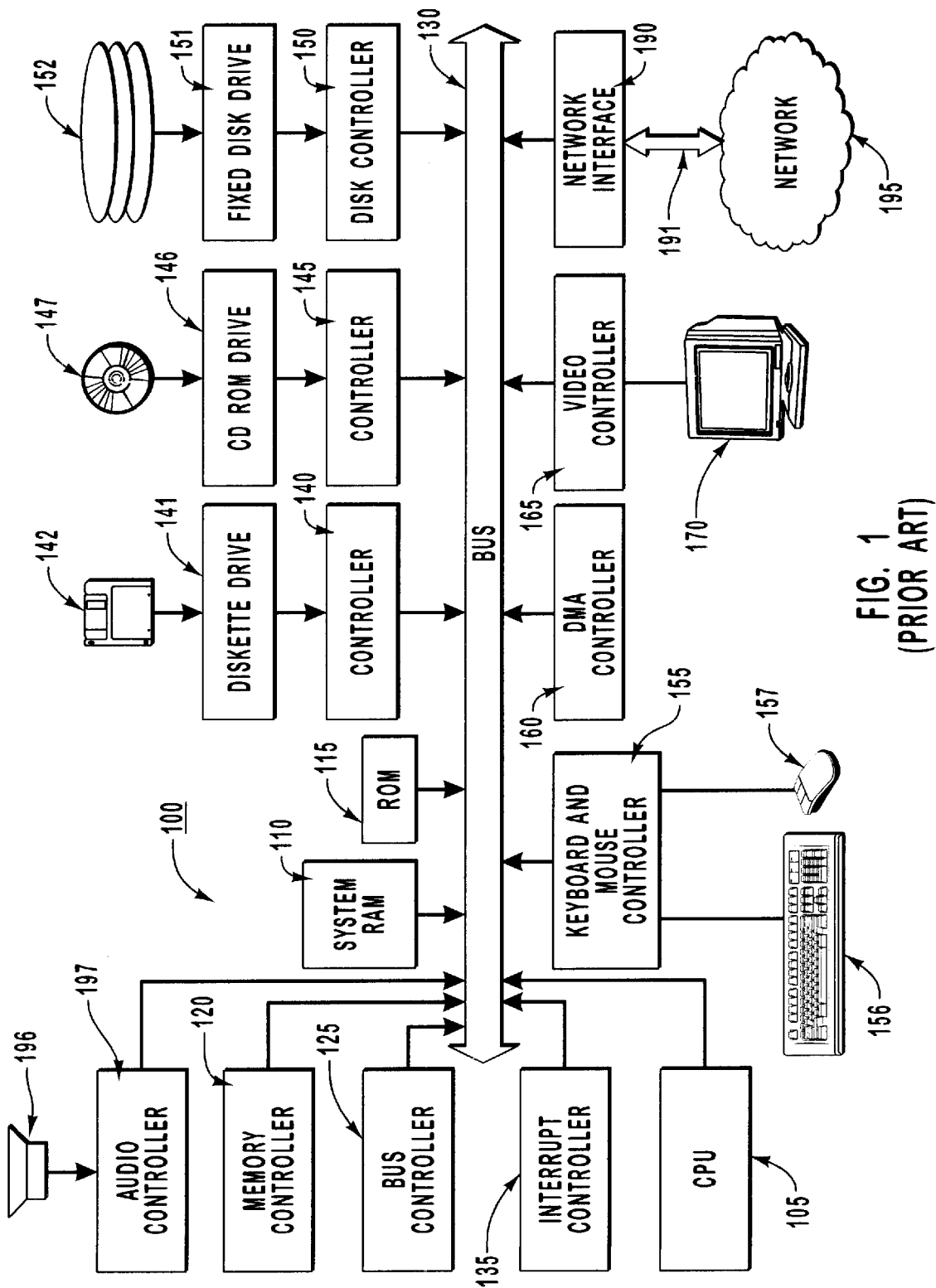
FIG. 1 depicts a prior art computer system upon which the management program operates in accordance with the principles of the present invention.

FIG. 1 illustrates the system architecture for a conventional computer system, such as personal computer that is either IBM- or Macintosh-compatible. The exemplary computer on which the inventive security system can operate. The exemplary computer system of FIG. 1 is for descriptive purposes only. Though the description below may refer to terms commonly used in describing particular computer systems, such as an IBM- or Macintosh-compatible personal computer, the description and concepts equally apply to other systems, including systems having architectures dissimilar to FIG. 1.

The exemplary computer 100 includes a central processing unit ("CPU") 105, which may include a conventional microprocessor; a system random access memory ("RAM") 110 for temporary storage of information and a read only memory ("ROM") 115 for permanent storage of information. A memory controller 120 is provided for controlling system RAM 110; a bus controller 125 is provided for controlling bus 130; and an interrupt controller 135 is used for receiving and processing various interrupt signals.

Mass storage may be provided by a diskette 142, a CD-ROM disk 147 or a hard disk 152. The diskette 142 can be inserted into a diskette drive 141, which is, in turn, connected to bus 130 by a controller 140. Similarly, the CD-ROM disk 147 can be inserted into a CD-ROM drive 146, which is also connected by a controller 145 to bus 130. Finally, hard disks 152 are part of a fixed disk drive 151, which is connected to bus 130 by controller 150.

Input and output to computer system 100 are provided by a number of devices. For example, a keyboard and mouse controller 155 connects to bus 130 for controlling a keyboard input device 156 and a mouse input device 157. A DMA controller 160 is provided for performing direct memory access to system RAM 110. A visual display is generated by a video controller 165, which controls a video output display 170. The computer also includes a communications adapter 190 which allows the system to be interconnected to a local area network (LAN) 195, a wide area network (WAN), as well as provide a Internet connect either via direct dial, or via the LAN or WAN, which is schematically illustrated by bus 191.

The computer 100 is generally controlled and coordinated by operating system software, such as the Windows 95, 98, NT, 2000, or other compatible operating systems. In the Macintosh systems, the operating system conforms to 7.5.5 and higher. Workstation compatible systems typically use a UNIX/LINUX-type operating system. Conventional operating systems control and schedule computer processes for execution, perform memory management, provide file system, networking, and I/O services, and provide a user interface, such as a graphical user interface ("GUI"), among other things. User applications, such as editors, spread sheets, and Internet browsers, directly or indirectly rely on these and other capabilities of the operating system.

Figure 2:
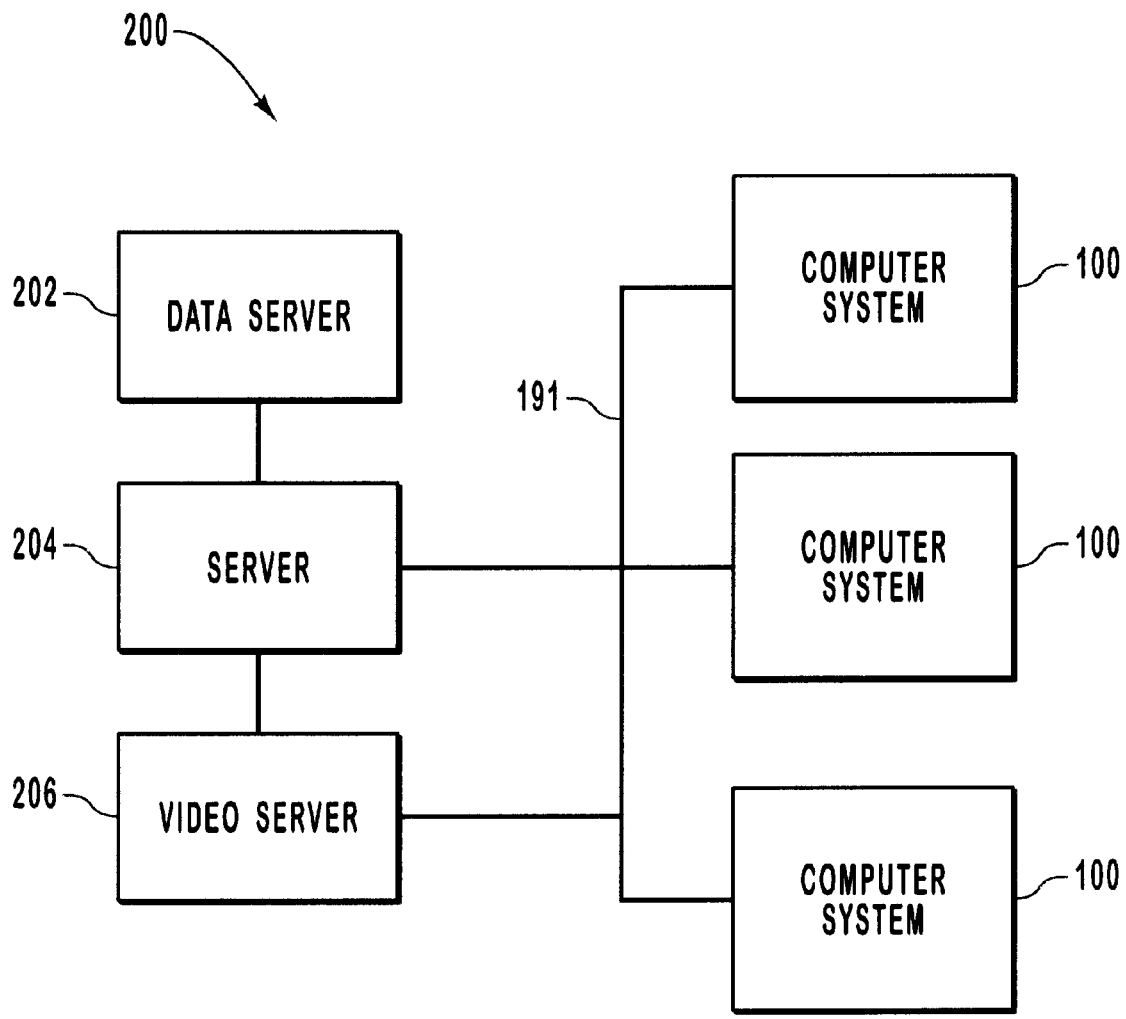
FIG. 2 illustrates a networked system connecting various user computer systems of FIG. 1 to a management and database system in accordance with the present invention.

Computer 100 connects to a network 195, which provides access to an instructional server database 200, which is shown in FIG. 2. Server database 200 includes a data server 202, communications server 204, and a video server 206. These all may be incorporated in a server computer system similar to computer 100 in hardware configuration, which utilizes an internet browser to provide access to a multitude of instructional media by an end user at computer 100. Further, server database system 200 provides for reporting of a user's interaction to a supervisor. For example, the principal of the school would be a supervisor of a teacher viewing the instructional media. The instructional media provides an interactive session with the teacher, who may answer questions, simple answer or multiple choice, or complete an essay exam or based on the information conveyed during the interactive session. A report of the user's performance and responses are what are forwarded to the supervisor in this example. Other examples include providing test results of a student taking an online instructional course, professionals reviewing continuing professional education requirements such as required in law, accounting or medicine.

Communications link 191 can be a direct line connecting to database server 200, such as a MODEM connection, DSL connection, ISDN, T-1, satellite, or the like. Link 191 may also be via a network that has an Internet server connected thereto. Further, system 200 may be part of a LAN or WAN and have the instructional media stored there on with management systems resident thereon for organizing and managing the feedback information received from the users which is to be reported back to the appropriate supervisor.

Server 204 controls the access to the learning resources that are stored within database server 202. The learning resources can be placed within server 204 via an interchangeable instructional or lesson module 205. The functionality of lesson module 205 is given in greater detail below. Server 204 allows end users, via their computers 100 to access the instructional materials available via the communication channel 191. A user utilizes a web browser, such as, for example, NetScape Navigator™, Microsoft Internet Explore™, or other web browsers known to those skilled in the art. The instructional materials are down loaded via video server 206 in multimedia form that include streaming or broadcasting video as well as video, audio, and text portions. A streaming video program is utilized as a plug-in to the web browser to allow viewing of the streaming video portion of the instructional segment. Examples of functional streaming video applets include RealPlayer™ provided by RealNetworks, as well as other streaming video products such as Windows Media Player provided by Microsoft, Inc. and QuickTime Player, provided by Apple Corporation.

Figure 3:
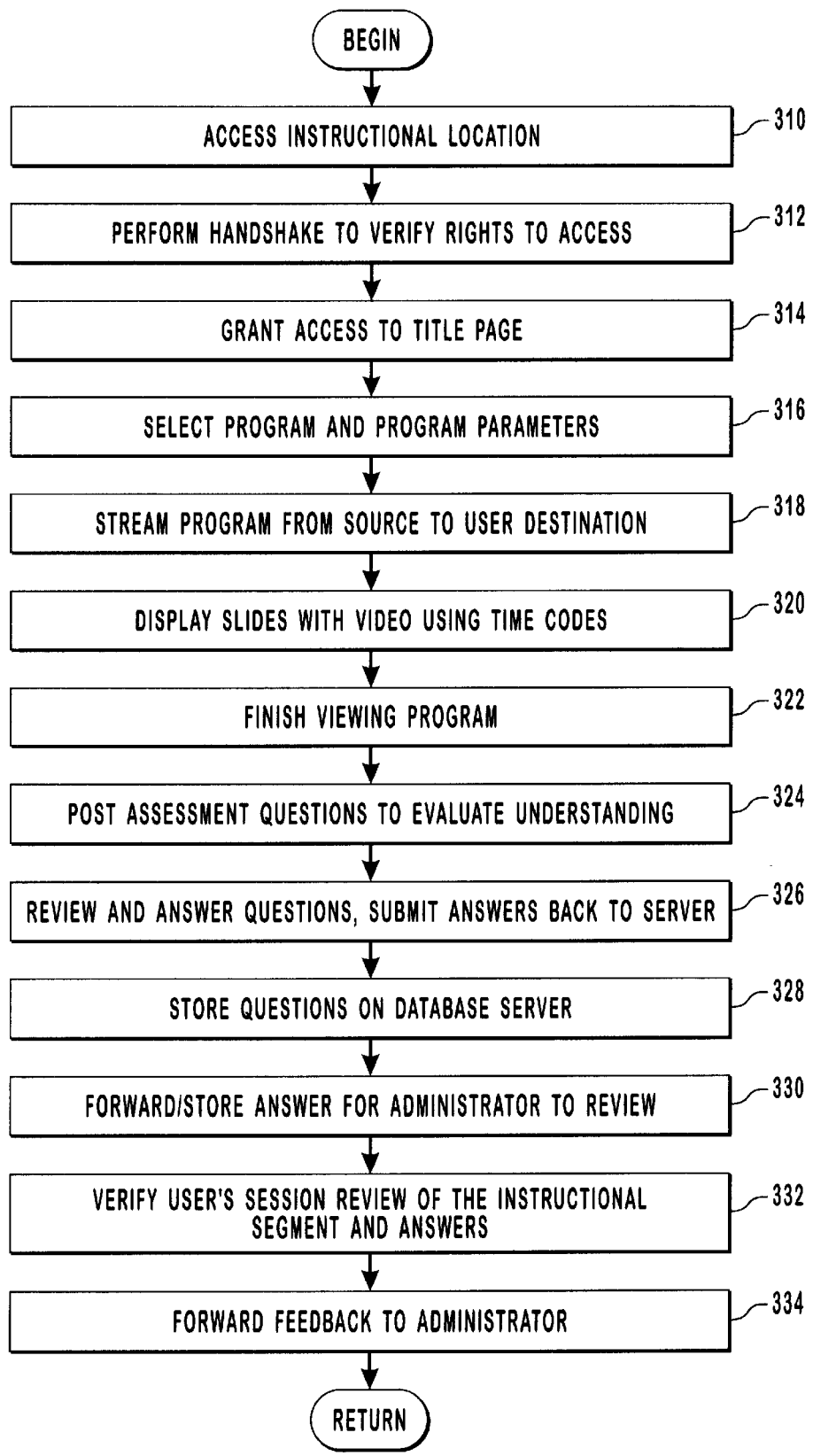
FIG. 3 is a flowchart of the procedure taken by a user to access, review, and be evaluated by the management program in accordance with the present invention.
Figure 4:
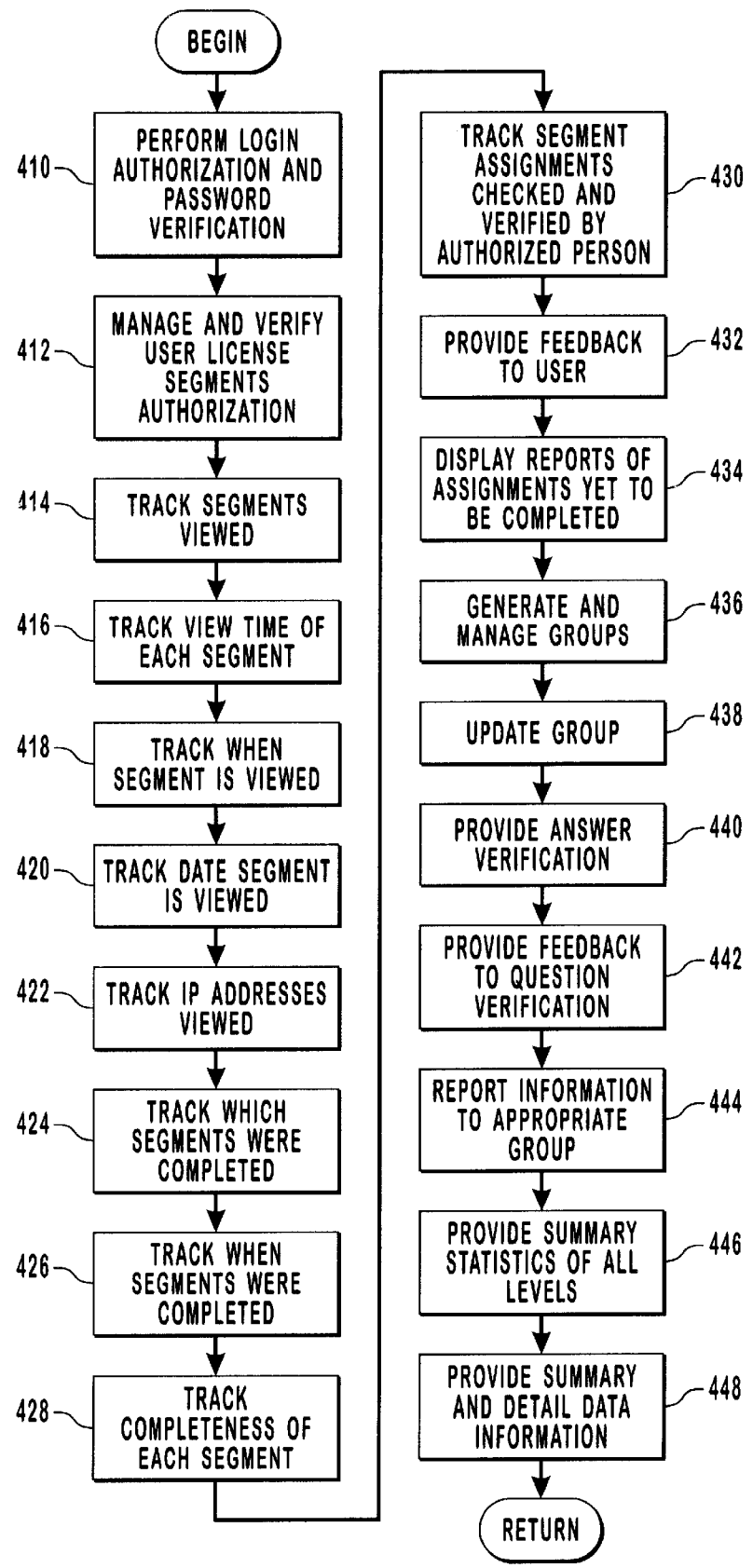
FIG. 4 is a flowchart illustrating the procedure of an administrator managing the management program in accordance with the principles of the present invention.

The instructional segments are streamed across the communications channel, i.e. the Internet, on demand to the end users. Also, the segments may be stored on a proxy cache server for non-internet access should the net connection be disconnected as well as to maximize bandwidth utilization. The users gain access to the authorized programs following a log-in and password sequence. Once logged on, the users can choose from several titles that are within their licensed course materials. FIG. 3 is a block diagram illustrating the method of granting access to the instructional segments, evaluating the user's understanding of the viewed materials, and providing report information back to the user's supervisors in accordance with the principles of the present invention. FIG. 4 is a block diagram illustrating the method of granting an authorized supervisor of one or more users access to user(s) records relating to information viewed and accessed by the user(s). FIGS. 5–12 illustrate screen images of a GUI viewed by either a user, administrator, or both in accessing the instruction materials, the report materials, or other evaluation materials contemplated within the present invention.

Figure 5:
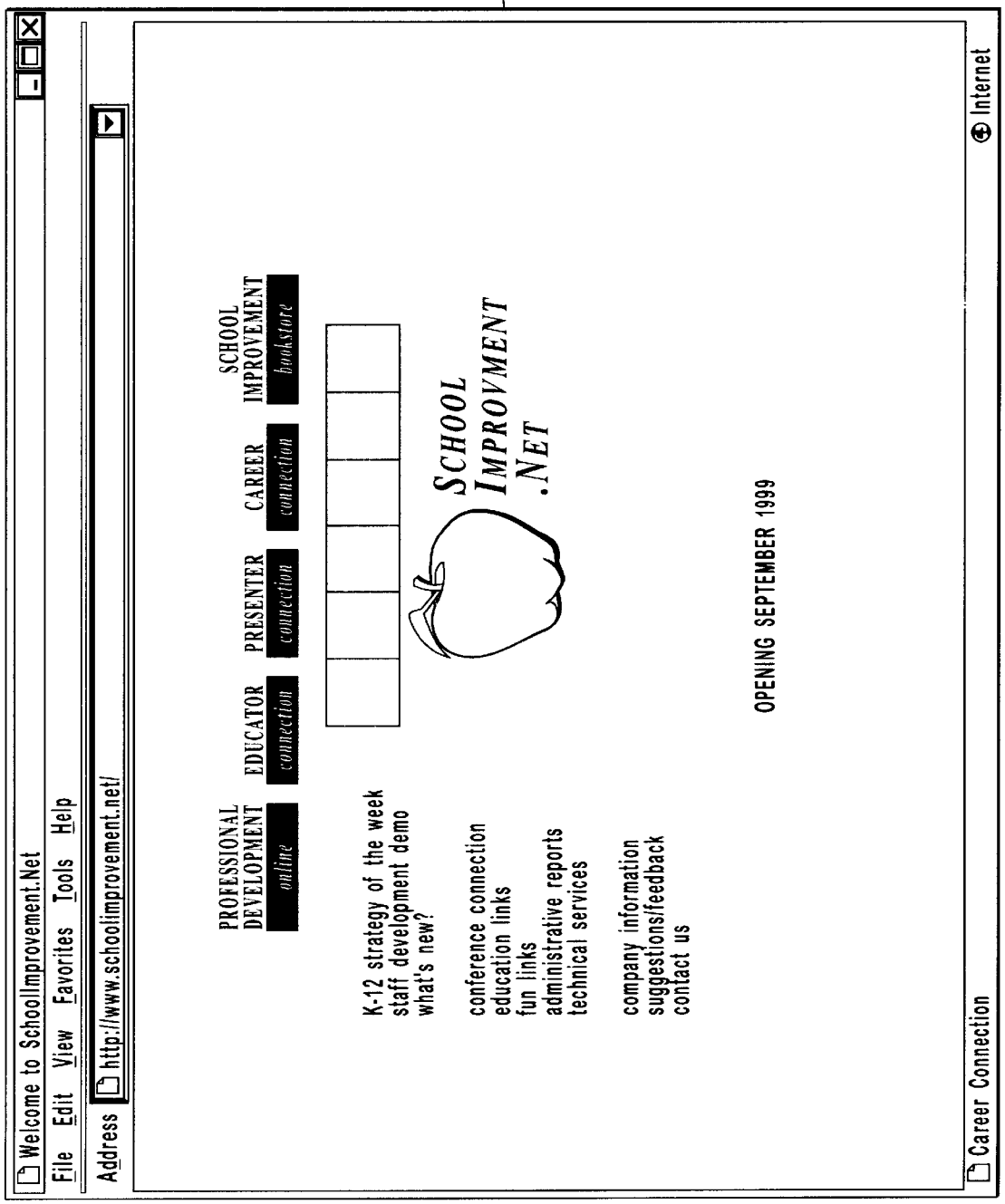
FIG. 5 illustrates a graphical user interface image of a view of the instructional segment site accessed by a user in accordance with the present invention.

In block 310, the user accesses database server 200 by selecting the appropriate instructional resource, either as web-based URL location via a web browser utilized by the user on the user's computer system 100. Upon accessing the appropriate web page, information is downloaded across the communications channel to the end user's system 100 for display. FIG. 5 illustrates a screen image of a user or administrator accessing an Internet or other computer or network accessible site. View 510 provides the user with several options, including accessing a Professional Development section, or accessing an Educator, Presenter, or Career section. Further, an online bookstore may be included, as well as other options as considered by the developer of the Web site. In this illustration, it is shown that the user is using Microsoft Internet Explorer as a web browser, which is readily available either at a commercial site, store, or free from many well known web sites. Just as the instructional sections are accessible by more than one user, so to the administrative sections can be accessed by more than one instructional leader or administrator.

For an overview, the system has the user login to access the system. The login is verified before presenting instructional titles for view. The user selects a given title with an appropriate bit rate for viewing and the program begins. The timing of the program begins simultaneously with the program. The system presents questions and content points to the user at the beginning as well. The content then plays for the user's review until end. Once the end is reached, the user reviews and answers the questions, which may be essay or multiple choice or a combination of the two. The questions are then submitted for evaluation verification, or both, and saved on the server.

The reports used by the administrators are reached after performing a login and verification to access the database. After the login and verification, the administrator views the authorized screen to make his or her selection. The administrator selects either the report or administration section. After making the selection, a data summary is provided for the users within the selected group. At this point, the administrator can select one of the users, review the user's exam, provide feedback to the user and verify the user's completion of the selected instructional segment. The reports also have the ability to auto email the users within the group of their standing or feedback re: the instructional segments. This includes notifying the user of his or her results or that the user must review the material and complete the associated exam. The invention will now be described with the continuation from where the user accesses the initial presentation screen.

Figure 6:
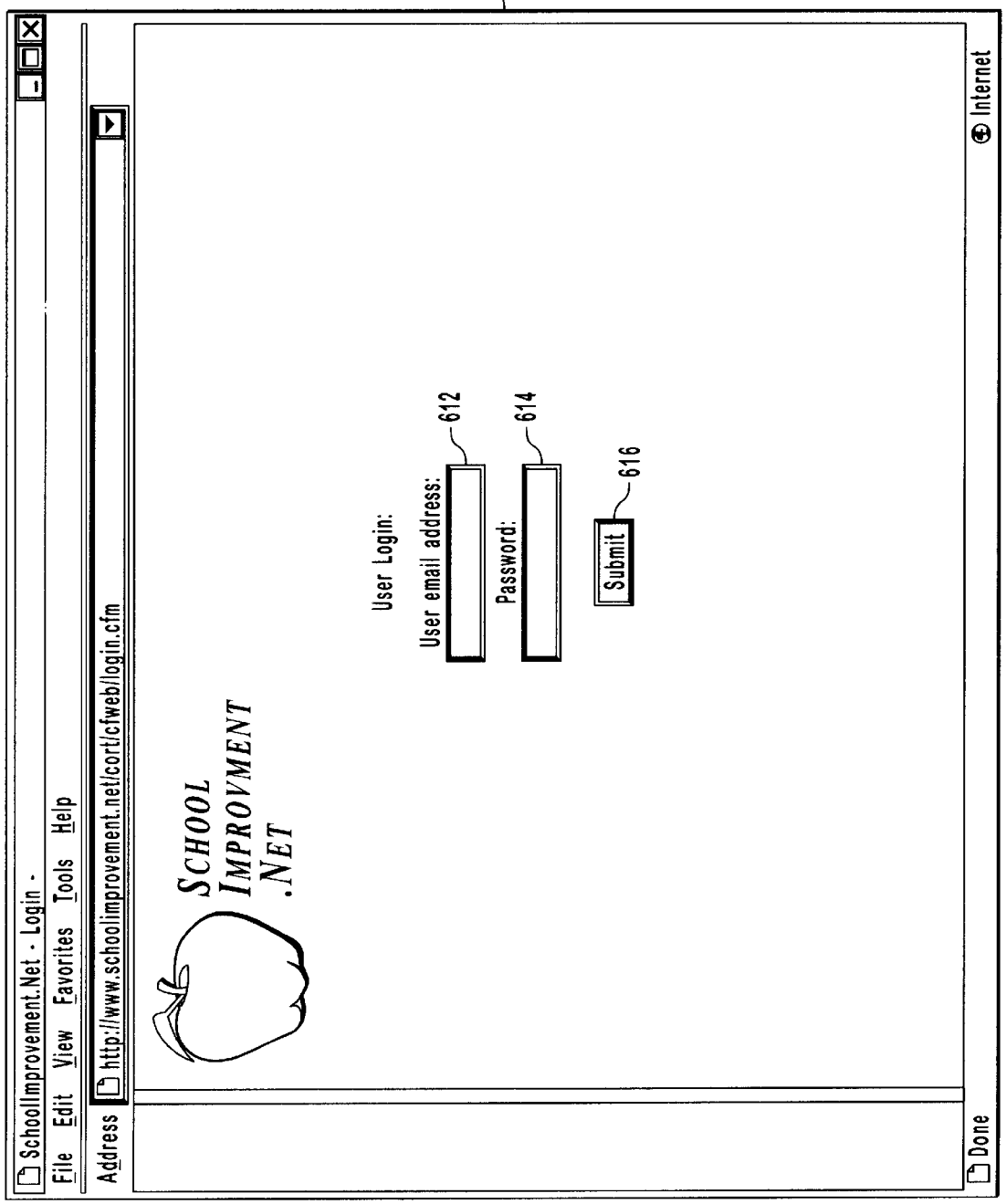
FIG. 6 illustrates a graphical user interface screen of a log-in screen where the user or administrator gains entry to the resources provided at the instructional site.
Figure 7:
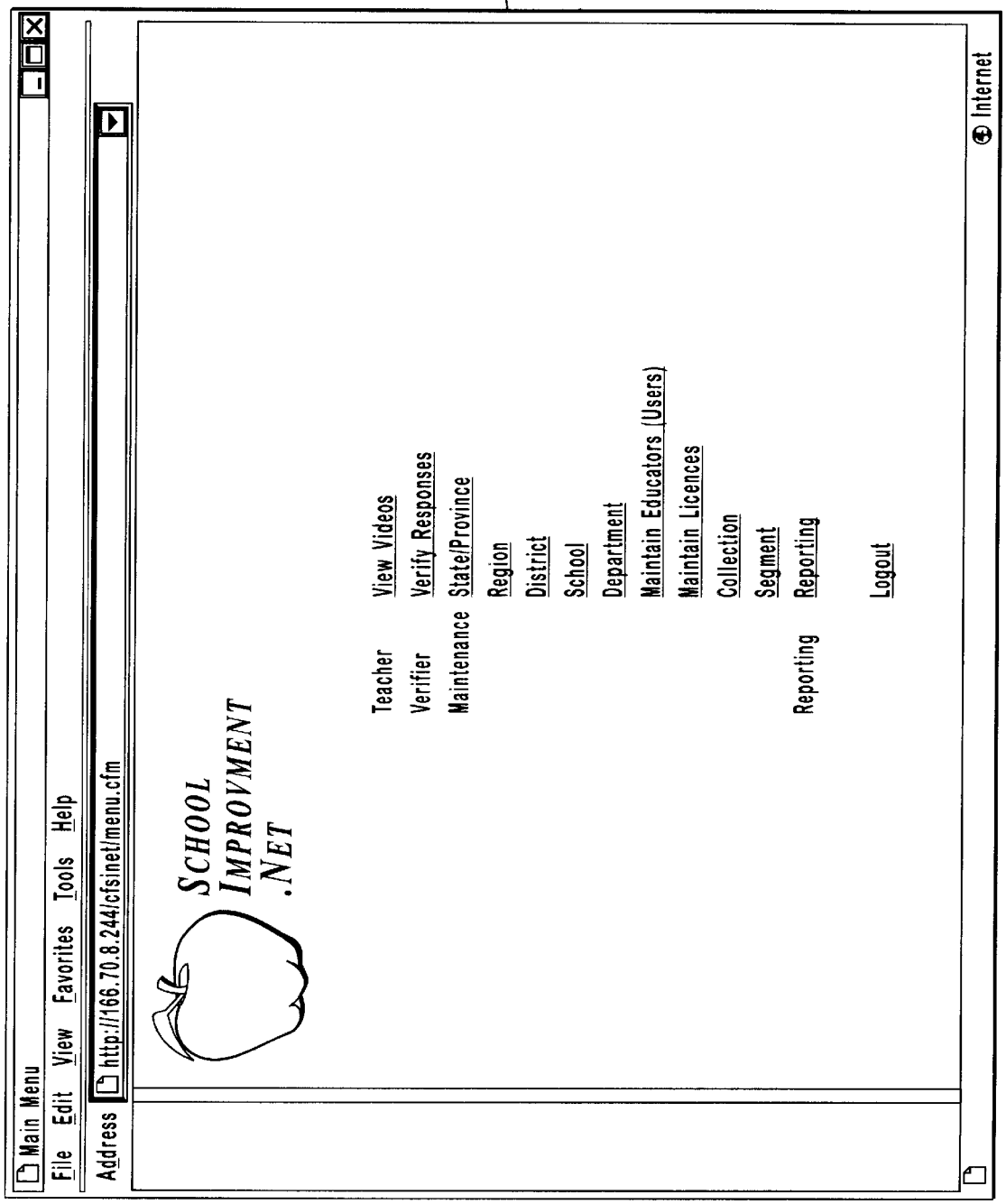
FIG. 7 illustrates a graphical user interface of a user option screen in accordance with the present invention.

The user then makes a selection. At this point a log-in procedure is provided for the user in block 312 that requires the user to enter in a password and log-in handle. FIG. 6 depicts a GUI illustration of the USER LOGIN screen 610. There is a USER login handle 612 and a password field 614. The user clicks on the SUBMIT button 616 to submit the login and user handle information. The system performs the handshake operation to verify the access rights of the user based on the appropriate login handle and password. Upon verification, the system, as shown in block 314, grants access to the title page to allow the user to select among the instructional segments provided for view. Other optional features include joining a chat discussion on the subject matter of a given segment as well as providing a threaded discussion group for review and correspondence among fellow users. The title page 710 is illustrated in the GUI panel of FIG. 7. Further illustrated is a list of exemplary options, such as VIEW VIDEOS, VERIFY RESPONSES, MAINTENANCE hierarchy, REPORTING, MAINTAIN LICENSES, and LOGOUT. Within the MAINTENANCE portion, the administrator, depending upon granted access rights, can access hierarchies at the State/Province, Region, District, School, Department levels. The administrator also has access to the users in the Maintain Educators selection. Other options of course are possible depending upon the subject matter and interest of the system designer.

Figure 8:
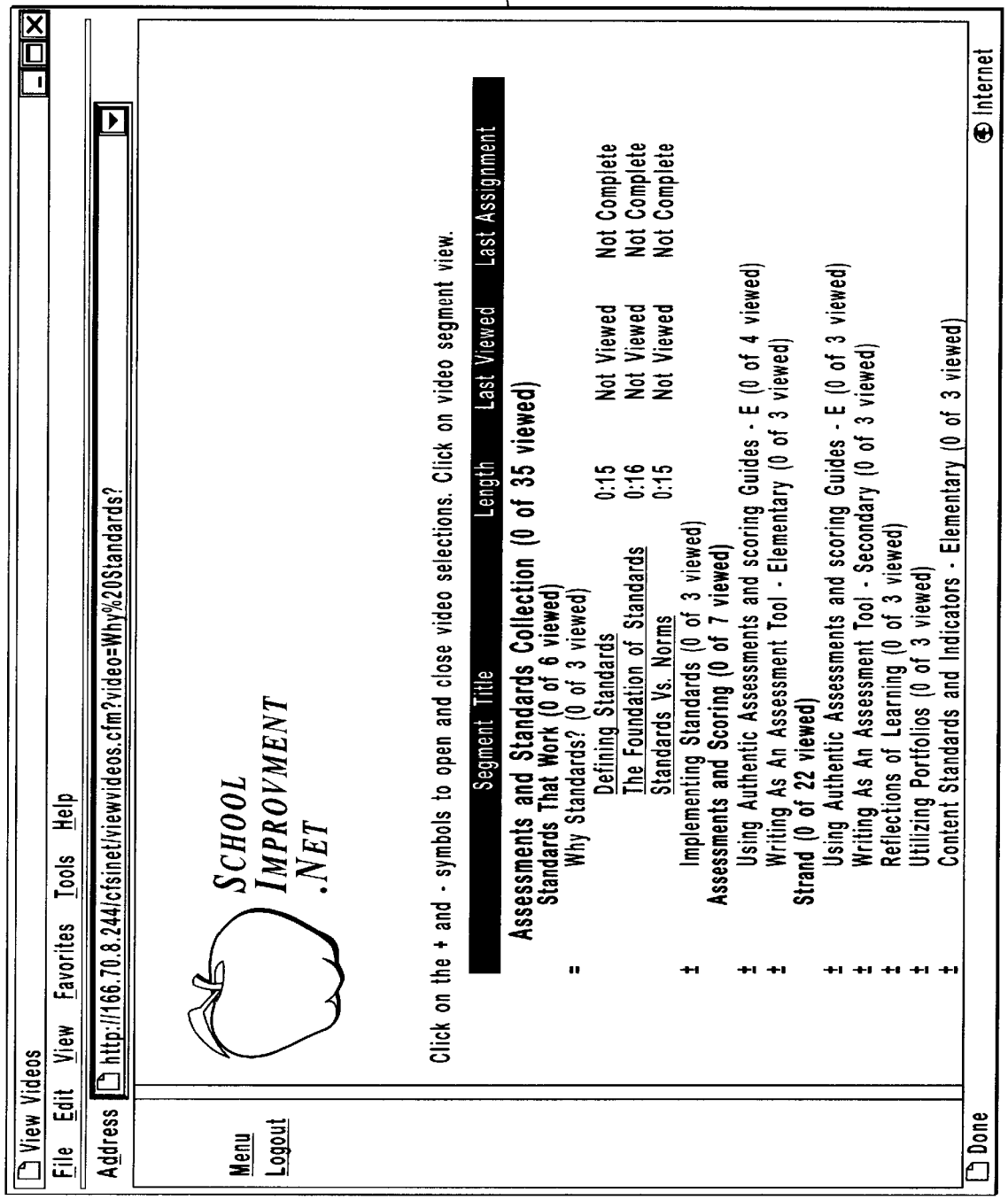
FIG. 8 illustrates a graphical user image title screen in accordance with the principles of the present invention.

If the user is a student and only has access to the VIEW VIDEOS section, then the user will be taken right to a screen image 810 as that shown in FIG. 8, where the user is given a list of titles from which to choose. The underlined titles or options shown in any of the screens may be accessed or activated by highlighting the desired section with the cursor and clicking on it with cursor manipulation device, typically a mouse. The active titles can be hyperlinks to licensed media, such as a video segment, and unlicenced media would be shown as plain text. Further, the user is shown the length of time each segment requires to view as well as whether the user has viewed the segment and whether the segment has been completed, which includes the evaluation or testing portion following the completion of viewing the segment.

Next, in block 316, the user selects a program along with parameters that define the program by selecting a title as well as the streaming bit rate of the program. Streaming bit rates depend upon the communications connection between the user and server 200. The user informs the server 200 what type of connection the user has and the server then optimizes the transfer of data based on the actual transfer rate established between the user and server. Of course the transfer rates can be determined automatically during the connection protocol sequence used by the server and user's computer. Upon selection of a desired title, database server 200 begins transmitting information over the communications channel to the end user at the selected transfer rate. Prior to the commencement of the instructional material, the questions or content points for the user to review can be provided. This makes the user aware of what to observe during the presentation of the program. Additionally, the user may print the questions or points for review and awareness during the instruction portion of the presentation.

Figure 9:
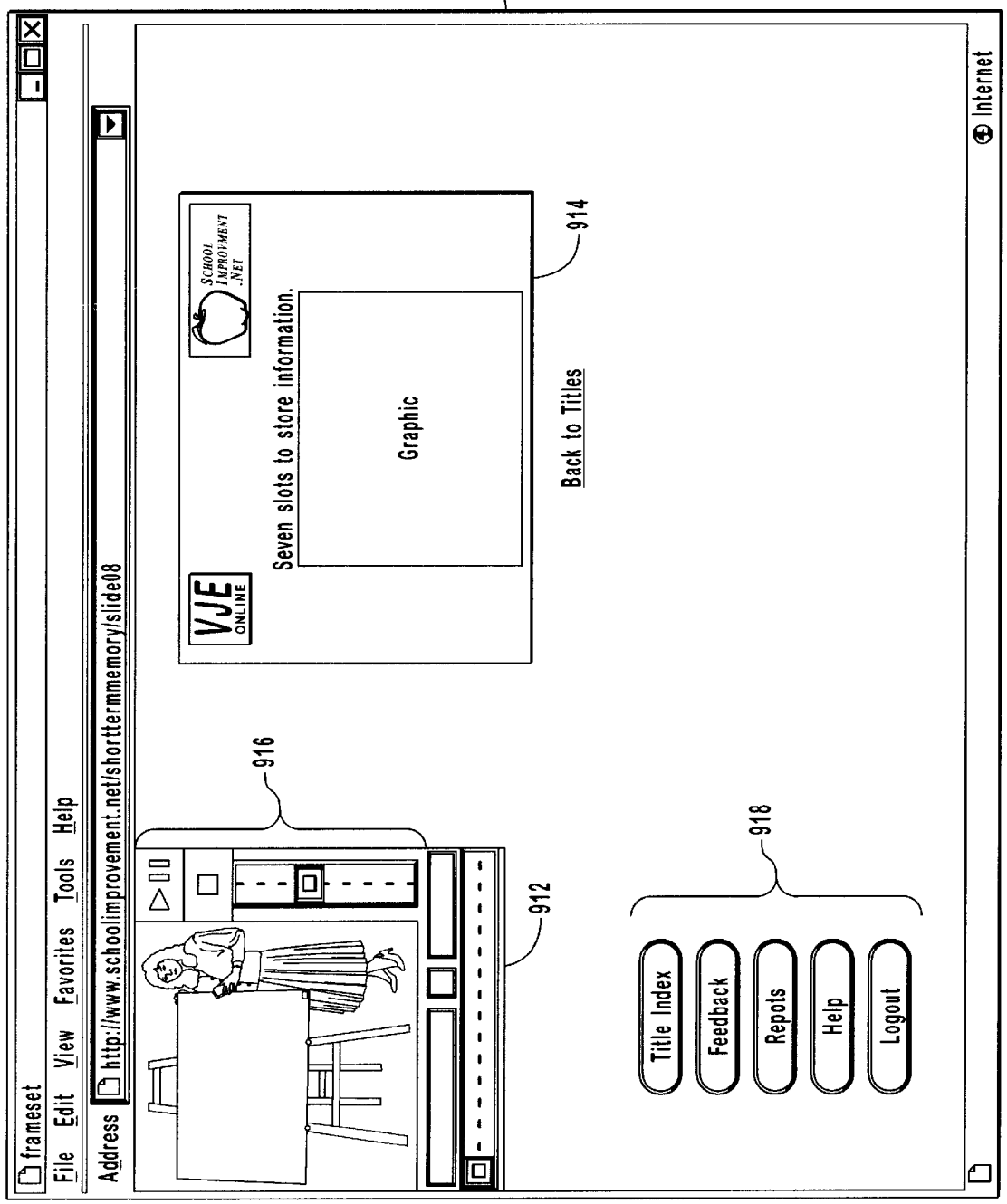
FIG. 9 illustrates a graphical user interface of a segment being viewed by a user, which segment includes a video portion and a still image portion in accordance with the present invention.

FIG. 9 is a sample image of a segment screen 910 that includes a video window 912, where video is streamed for the user's review, as well as slide window 914, where text or still images are presented to the user. Server 200 streams program information from its database storage sites to the end user, as shown in block 318. A plurality of images 914 can be provided with the streaming video portion of the instructional segment as shown in block 320. The still images are displayed in window 914 along side the streaming video, shown in window 912, using timing codes. The user can pause the video window 912 via video controls 916. Video controls 916 also allow the user to replay portions of the video, backtrack, pause, stop, or skip ahead as well as control the volume as needed. The timing of the video is based on the URLs of the slides that are played, which is merely one example of the timing that may be used. Another method to provide timing is to cue the slides to the video, or even to be independent so the teacher or user can select the next slide when ready.

Figure 10:
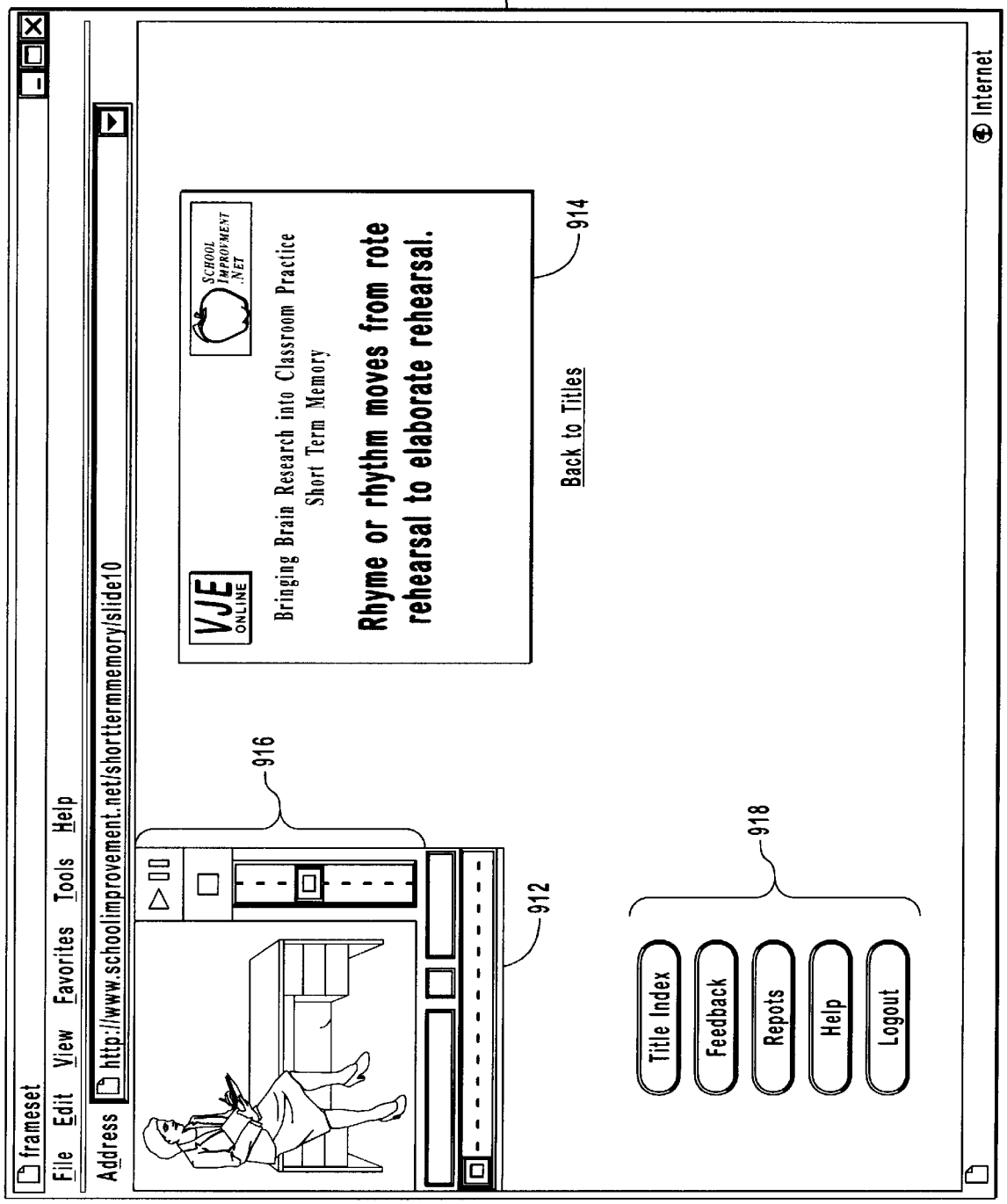
FIG. 10 illustrates a graphical user interface of that of FIG. 9 wherein the still image portion displays text corresponding to the instruction given in the video portion.
Figure 12:
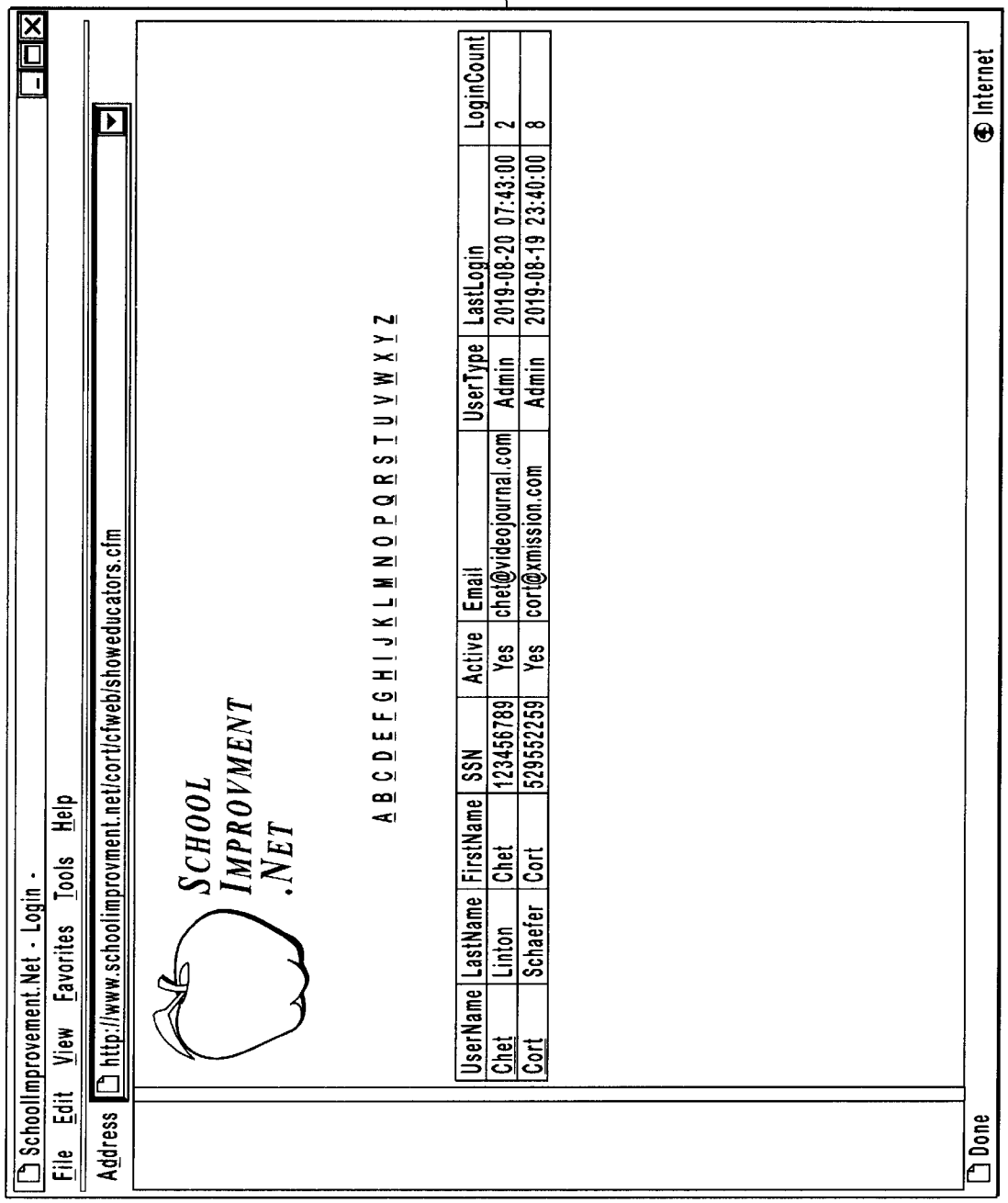
FIG. 12 illustrates a graphical user interface of an administrative user update screen in accordance with the present invention.

FIG. 10 illustrates a subsequent window 910 where the still image window 914 displays text. The text is timed to enhance and emphasis points being made by the instructor shown in window 912. In both FIGS. 9 and 10, the user has the ability to select any new Title Index, provide Feedback, access reports designated for that user, as well as obtain Help or Logout of the site by utilizing the appropriate buttons 918 depicted within window 910.

The still images are an option that supplement the discussion provided with the streaming video by highlighting important points in the instructional segment, which may include dates of interests, formulas relevant to the discussion, illustrative graphics, or lists of related matters for expanding understanding of a given subject. Thus, after selecting a title, the instructional segment streams across the communications channel from the server to the user's computer. As the program begins to stream, a slide presentation is also presented, which is linked to the synchronized time code of the program and video. Instructions are also provided to the user prior to the beginning of the video. The segment contains questions that are presented at the end of the program, as well as questions that are featured at the beginning to stimulate the viewer to be aware of specific strategies, theories, and applications. Each instructional segment lasts between 5 to 90 minutes, including the comprehension test at the conclusion of the session. The actual time varies according to the content level, user sophistication, and bandwidth availability, among others. The system designer can vary the time to under 5 minutes or greater than 90 minutes in accordance with the designer's preferences.

At the end of the presentation portion of the instructional segment, the assessment questions are automatically posted for the user to answer as depicted in block 324. FIG. 11 illustrates a screen image of a window 1110 displaying a sample questions segment in accordance with the present invention. The user's name, which may be pulled automatically from the login data of step 312, is placed in the NAME field 1112 and the association of the user is placed in DISTRICT/SCHOOL field 1114, which may be re-labeled as BUSINESS/GROUP or SUBJECT/INSTRUCTOR depending on whether the user is part of a group within a given business or is a student studying a particular SUBJECT taught by a given INSTRUCTOR. Other options will be readily apparent to those skilled in the art. As the user answers the questions 916, the user writes the answer within answer window 1118 and then submits the answers back to server 200, shown in block 326. The questions and answers are stored on database server 200 as illustrated in block 328. Database server 200 may be SQL compatible so that the stored answers may be retrieved quickly for viewing by a supervisor having access rights to that particular user's file log. SQL is but one type of compatible databases that may be utilized, other similar database systems may be substituted within the ordinary skill of the artisan. Further, the system can automatically forward the answers to the pertinent administrator for review as depicted in block 330. Or the answers may be held for review offline off the server. Next, in block 332, the answers given by a user(s) are verified and given to the user of the verified answers. Feedback is also provided to the administrator as shown in block 334. The feedback of the evaluation of the user's performance in answering the question, which can be stored in a personal portfolio for each participant and reviewed by each participant, can be automatically given via a direct e-mail to a valid e-mail addressed provided by the user or posted back to the user's personal access point entered via the password and login portion of the site. Of course, the results can be printed and mailed to the user as an option to provide the user with a validated hard copy. Once an instructional segment is completed, the user is allowed to select another title to review or is allowed to log out thereby completing the instructional session. Further, if some user's fail to participate in a timely manner, reminders can be sent to the user via email, voice messaging, or a letter, to remind the user to complete the programs within the allotted time prescribed.

Administrative reports are generated based upon a user's accessing the instructional segments in accordance with the present invention. These reports are used to provide feedback to instructional leaders or administrators that, in an example of a teacher participating in a teacher development and enhancement program, includes the identity of the faculty member logging accessing the interactive training segment module, the duration of each faculty members time on line, and the results of the comprehension test/activity at the end of each segment or module. The information can further include access date and time, IP address of the machine used by the user, assignment completion, and exam/assignment verification, and feedback activities. Administrators or instructors at all levels use this data to verify, evaluate, and enhance staff development throughout their school districts. Likewise, if this were the case of a teacher providing instructional materials on-line for students, the teacher would receive evaluation reports that would include much of the same information. For example, a teacher would want to know how long each student spent on-line viewing the instructional material and how long each student took to answer the comprehension exam at the end of the segment. This would allow the teacher to gauge which subjects and concepts the class as a whole is struggling with as well as what subjects each student comprehends and those topics the student does not comprehend. This allows the teacher to customize the feed back to the student in helping the student understand the content of the lecture material for the comprehensive exam that is to follow.

FIG. 4 outlines the type of tracking and reporting functionality and information provided by database server 200 to the appropriate supervisor or administration in accordance with principles of the present invention. In block 410, and as shown in FIG. 6, the administrator performs a login authorization and password verification step where server 200 checks the login and password provided by the administrator to verify the administrator can access the system and what rights the administrator has and what database sections are open to the administrator. Next, in block 412, the system manages and verifies the user license segments authorization. At this point, the administrator is allowed access, as shown in Window 710 of FIG. 7, to various levels of information provided for each individual user utilizing the instructional segments for learning and comprehension. System 200, for each individual user, tracks which segments that have been reviewed by the user in block 414, tracks the view time of each segment, as shown in block 416, and tracks when the segment was viewed as well as shown in block 418. The system also tracks the date the segment is viewed (block 420), the IP addresses of the programs being viewed (block 422), and which segments were completed (block 424). Furthermore, the system tracks when the segments were completed (block 426), how much of the segment was actually completed (block 428), and which segment assignments that have been checked and verified by the administrator (block 430). Once the administrator has reviewed the report of the user's access of the instructional segments, the administrator then generates, in block 432, a feedback report to the user regarding the assignment answers to be posted either via E-mail or as an amended message on the user's assignment page on the server, or through a hard printed report sent through the mail, or a combination of the three, among others. Further, the system, in block 434, displays whether an assignment has been verified or has been completed.

Figure 13:
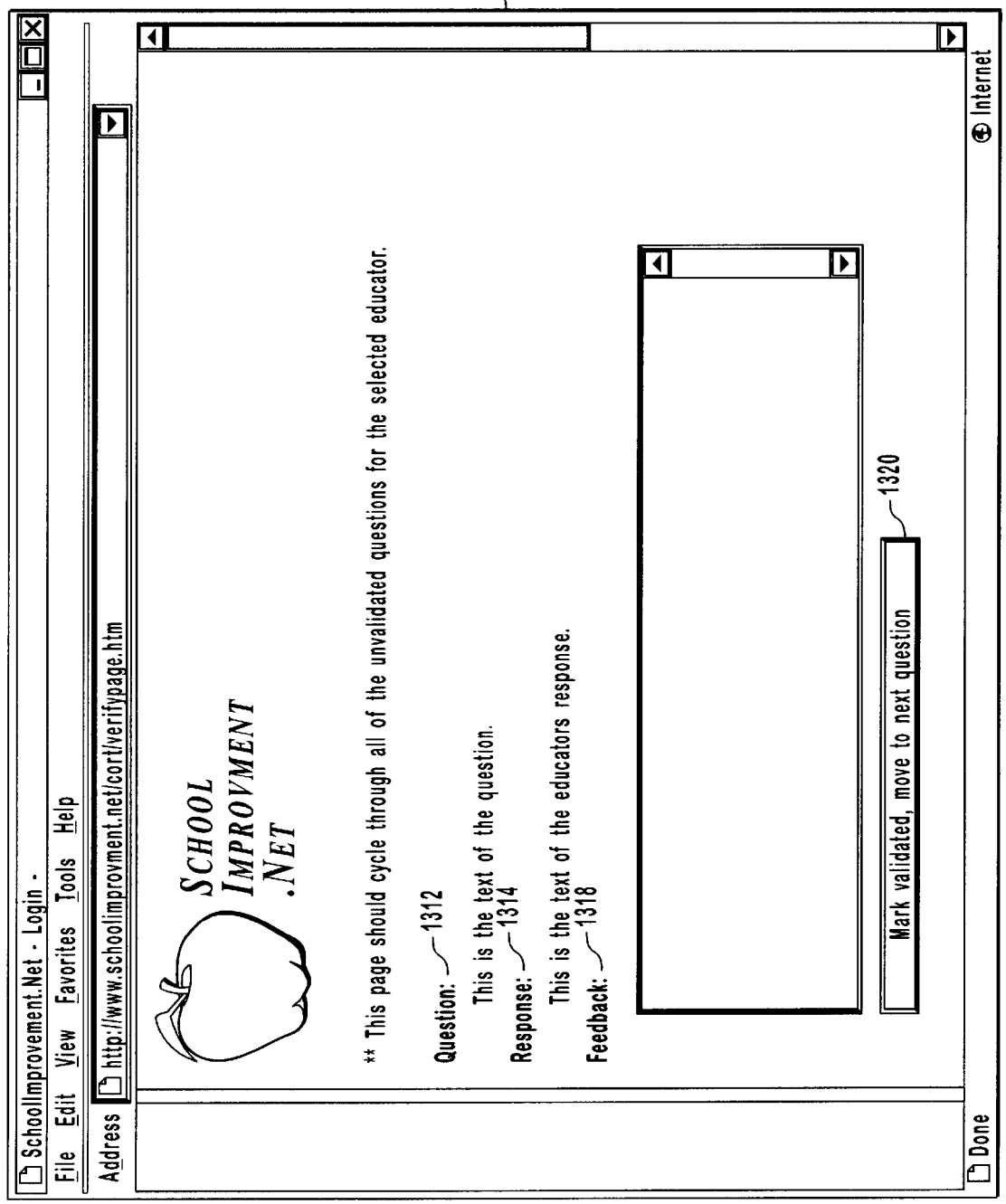
FIG. 13 illustrates a graphical user interface of a questions feedback and response screen in accordance with the present invention.
Figure 14:
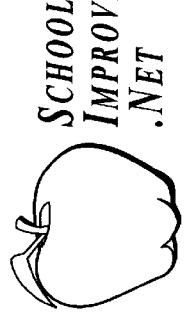
FIG. 14 illustrates a graphical user interface of a user report showing viewing history and assignment data in accordance with the present invention.

System 200 further allows an administrator to create and manage various groups as shown in block 436. FIG. 14 illustrates a group of teachers in window 1410. In the example of the teacher participating in a teacher development type instructional program, the administrator, typically the school principal at which the teacher teaches, can generate and manage teacher groups, administrative groups, or other groups according to the desires of the administrator. Since the administrator is authorized to establish groups, the administrator can update the group as shown in block 438 as well as update any other information relating to the teacher group, administrative group, student group, or other types of information. The administrator, as shown in block 440, also has the ability to assign educators, i.e. teachers, the right to verify the responses from other educators to each question used in a particular video instructional segment. Once an individual has the right to verify responses from others, the verifier is given the ability to provide feedback to the question responses a shown in block 442. FIG. 13 illustrates a screen shot of a Question and Feedback view 1310. A Question field 1312 provides the text of the question. A Response field 1314 provides the response given by the user. A Feedback field 1316 allows the reviewer to give feedback back to the user for the response. The user in this case can be either the teacher answering the question or the administration asking the question and providing a sample response or answer to the question. A Verification button 1318 allows for the user to verify a question.

Figure 15:
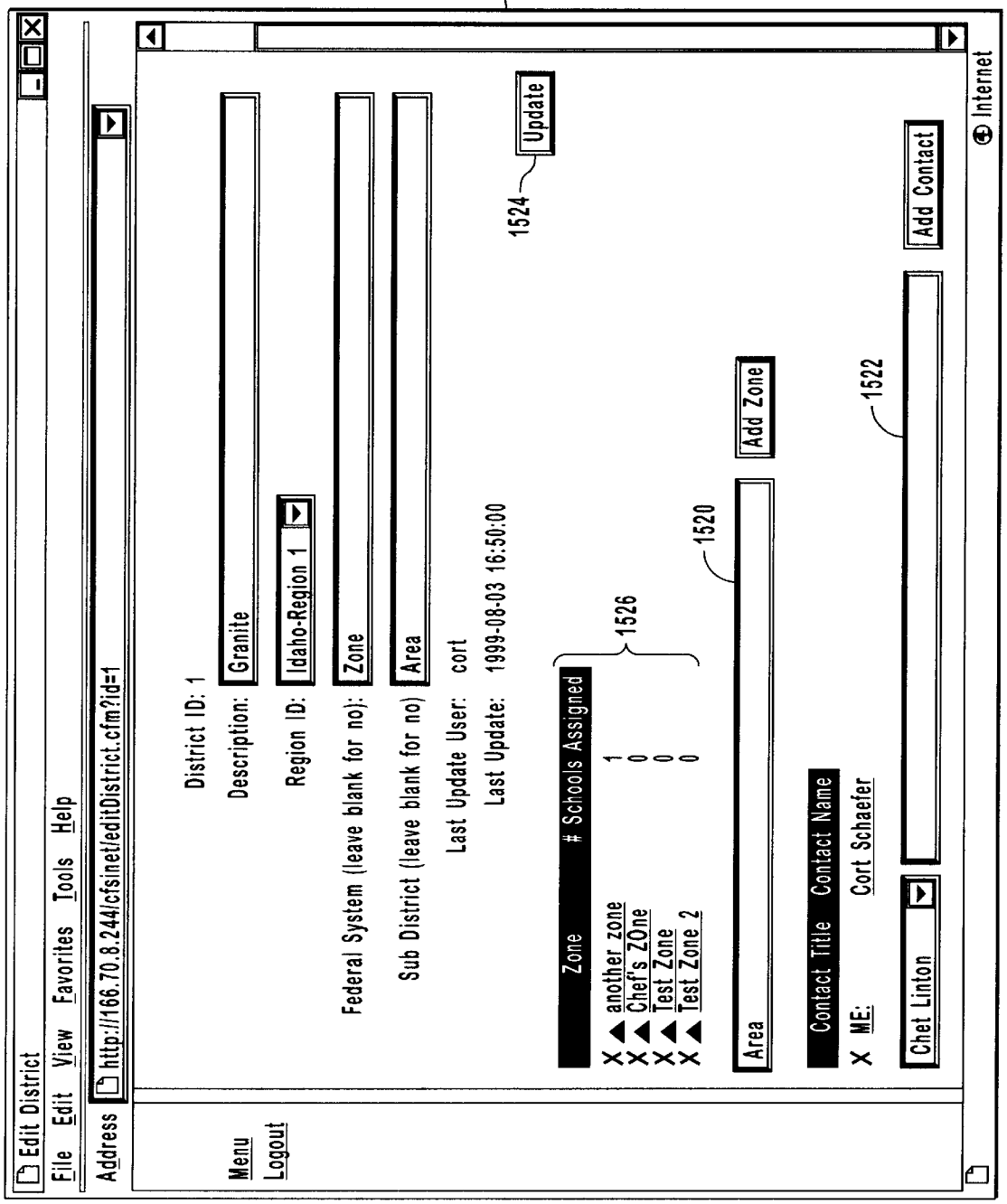
FIG. 15 illustrates a graphical user interface of a district setup screen in accordance with the present invention.

The system also allows for reporting of information to be given at various levels of stewardship, which include state, regional, district, area/subdistrict, feeder zone, school, department, educator levels, and teacher as shown in block 444. FIG. 15 illustrates a screen image of a District setup screen report 1510 in accordance with the principles of the present invention. The setup screen 1510 shows the District ID, the district Description, Region ID, Feeder System, and Sub District information. Viewing History and Assignment Data of the users in the group. The administrator can also add new feeder zones in field 1520 as well as add new contacts in field 1522. Once the new information is entered, the administrator selects the Update button 1524 to update the fields of District ID, Description, Region ID, Feeder System, and SubDistrict. A Feeder zone field 1526 shows which feeder zones have been established and how many school or organizations have been assigned thereto.

FIG. 16 illustrates a Department/Grade Level setup window 1610 very similar to the window 1510 of FIG. 15. In window 1610, the administrator establishes the departments in Department field 1626 with the number of educators or users assigned thereto. The administrator can change the feeder zone assignment via feeder zone assignment window 1628.

FIG. 17 illustrates a sample User Setup area window 1710 in accordance with the present invention. Window 1710 includes an alphabetical listing for quick access to a user. By selecting one of the listed letters, the administrator will be given a listing of those users (teachers) having a last name beginning with the selected letter. The user profiles include the user's name, first and last, active status, email address, user type, last login information, and total login count. Selection of a users UserName causes the system to pull up the user's profile window 1810 shown in FIG. 18.

Figure 18:
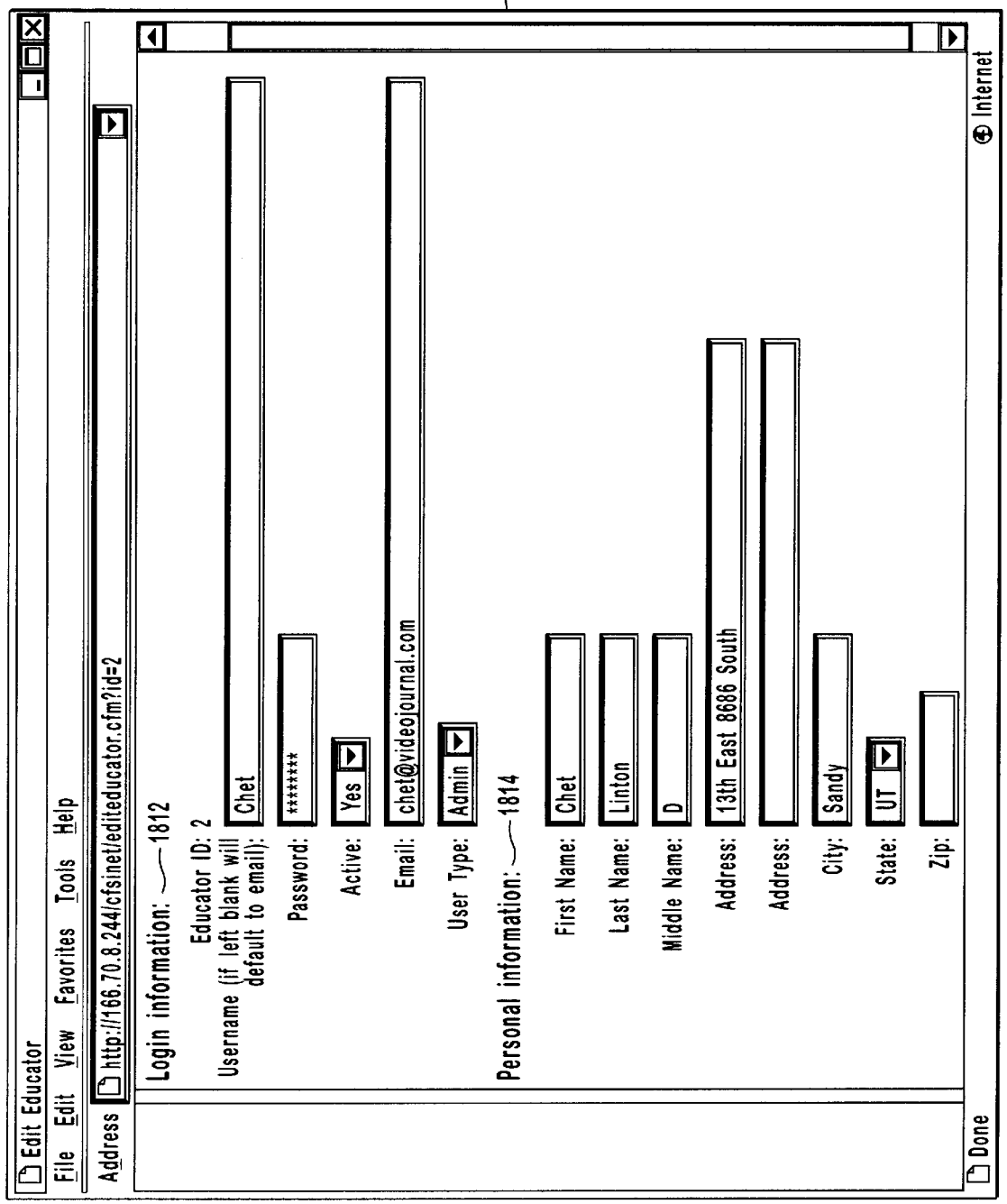
FIG. 18 illustrates a graphical user interface of a user setup screen in accordance with the present invention.

FIG. 18 illustrates a User Setup Screen window 1810 in accordance with the present invention. The window 1810 allows for the administrator to define a given user. The user is given login information in field 1812, which has an Educator ID as well as a UserName, which defaults to the user's email address if one is not provided. A password is assigned and an active status is defined (active or inactive). Further, the user's email address is provided with a definition of what level of access the user has. In this example, the user is defined as an administrator (admin.) After the login information is completed, the user's personal information is provided in field 1814, which includes full name, address, city, state, zip code etc. Once the user information is added or modified, the information is saved and the administrator returns back to the list of users in FIG. 17.

Additionally, summary statistics of the above data is provided by teachers, department, grade level, school, district, regional, and state levels as depicted in block 446. This information may also be provided at a national level where a country has a small enough population to manage all the teachers, or the country has a national education policy that supervises all the sub groups within the educational department. FIG. 19 illustrates a report window 1910 that reports information related to a selected Feeder zone 1 in this example. Feeder zone 1 includes 12 schools ranging from elementary to high schools. Included are the feeder schools to the high school, such as the junior high and middle schools. The report includes number of segments offered, the total number of segments expected to be viewed, the actual number of segments viewed, the number of assignments completed, a calculated participation percentage, and the number of users licensed per building, referring to the school or site in the feeder zone. A total is provided for each school and then a Feeder zone Total 1912 is provided in the report as well.

Further, the system also provides summary and detailed data information that may be viewed by day, week, month, year, since the inception of the evaluation program, or by any other user-created date desired. In the example of FIG. 14, one user is illustrated that has completed one segment, listed by Segment Title and Assignment completed. This is also verified by the date shown. The time at which the segment was viewed along with the date and machine are also shown.

Figure 20:
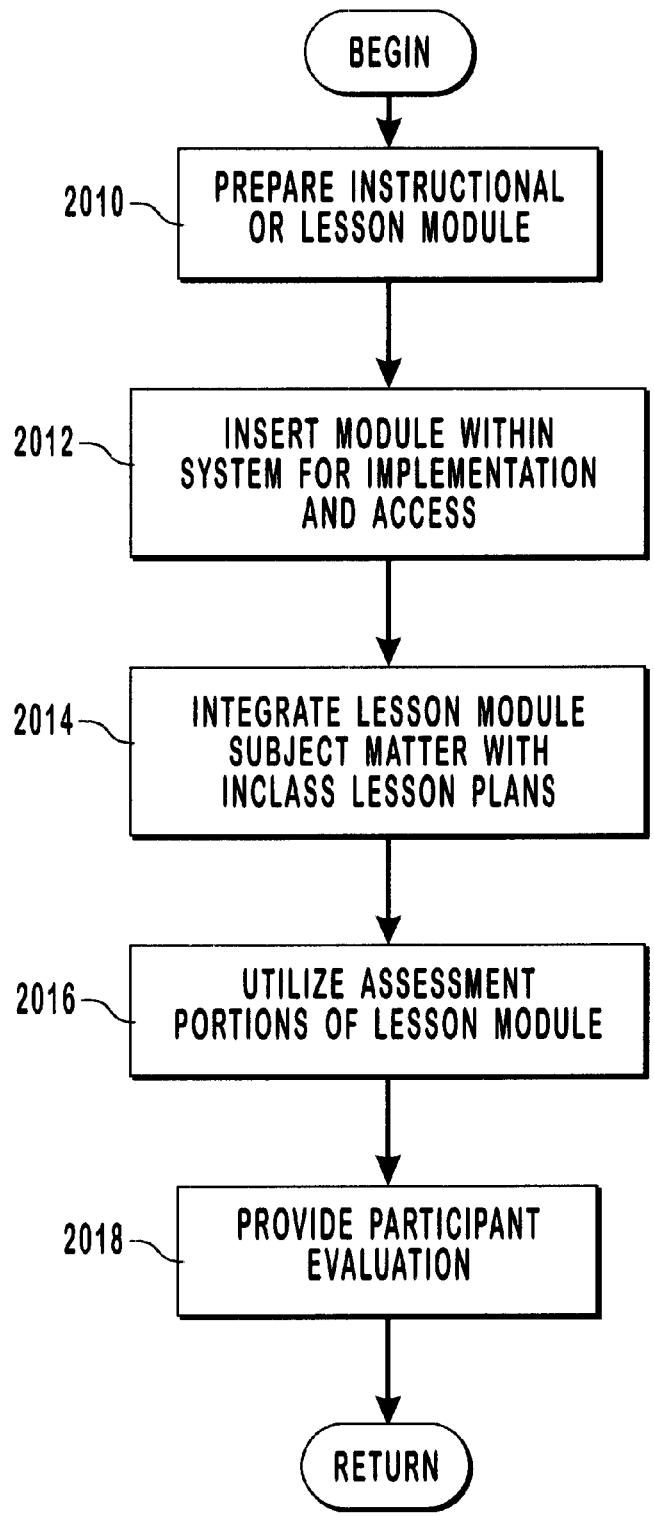
FIG. 20 illustrates a flow diagram of the formation, implementation, and use of the interchangeable lesson modules shown in FIG. 1 in accordance with the present invention.

The system also includes the ability to customize or modify the training or lesson modules 205 of FIG. 2 and replace them seamlessly thereby allowing the training sessions to be updated and upgraded at any time. FIG. 20 illustrates the implementation of a lesson module 205 in accordance with the present invention. The customization is based upon the criteria provided by the institution or manager of the system. For example, a school system that has specific goals would want the modules customized according to the teaching goals, educational goals, or achievement goals spelled out within the school system's mandate. Instructional modules, as shown in block 2010, are completed by the educator or instructor according to a format that allows the developer of the module to display images, video, or text, or a combination thereof, as well as a set of questions for inquiry either before or after the student or user of the module has reviewed the instructional material of the module. The module and system are structured such that the questions are presented in a seamless fashion according to a particular method.

The first method of presenting questions is through a pretest of the subject matter to determine the level of understanding of the user prior to the actual presentation of the media material. The second method of presenting the questions is through an end test, after the student has reviewed the subject matter to determine the comprehension obtained by the user during the review of the multimedia material. Another method is a hybrid where questions are asked at each stage of media material presented to spot understanding at the time of presentation and to provide review of those items missed. Lastly, after periodic review has been tested via intermediate questions, a final review is performed to assess the user's overall comprehension of the multimedia material. The advantages of the pretest are that it allows the user to skip reviewing multimedia material for subject matter that is already well known and to present to the user the types of questions and subject matter expected to be learned during the viewing of the multimedia material.

The modules are readily installed within the interactive multimedia presentation and review system, shown in block 2012, by way of specific fields that are provided that either map or direct the system to access materials within the module at the appropriate time for presentation of various subject matters. Each module can include assessment information, such as a pre-test, to determine the status and comprehension of the participant. An assessment screen will be displayed that begins the procedure for the participant. The assessment screen is tied to this particular location through a flag or a direct subroutine to pull the screen up at the appropriate time. Prior to that, a user menu would be provided that allows the user to view the user's profile, any review materials provided for the user, the assessment portion, or any other areas that have been granted access to the user based on the user's performance or status.

For example, if the user happens to be the instructor, the user can access any portion of the module, such as each participant's independent profiles as well as the sample questions, test questions, or other materials appropriate for the teacher's status. Each subject matter that is presented for educational and instructional purposes typically will include the assessment or pretest portion, the actual presentation of the material during the covering the subject matter, test reviews of the subject matter, final tests to cover the subject matter, as well as question and answer sessions in a multimedia environment that are intended to be of benefit to the users or participants.

In one exemplary embodiment that would be utilized within a school environment, the system can include a plurality of modules that allow students and educators to review each module appropriate for their level of understanding. These modules can provide continuing educational development instructions or fulfill the requirements of a particular course in which they are enrolled. The school system can establish the goals for the staff and establish a module that would be beneficial for staff members. The staff members can then review the materials on-line and complete the educational development requirements or other subject review, such as safety training modules, legal advisement modules, medical training modules, cleaning training modules, or administrative tasks modules.

For each module that requires assessment of the user's interaction of the subject matter presented, the developer generates a questionnaire designed to assess the knowledge, skills, and understanding of each participant based on the hierarchy of data defined within the particular module and that is compatible with the system goals. The lesson subject matter can be stand alone within the computer training environment or, as shown in block 2014, the lesson subject matter is integrated with classroom lesson plans or other extracurricular assignments that illustrate the subject matter being presented. Next, the system selects the appropriate modules based on the user's knowledge and prior experience, or lack thereof, to customize which modules are appropriate for the user's needs that are compatible with the school system's goals. The user then works through the training segments, completes the questions asked at the end of each training segment, then performs and fulfills the various activities that may be required of the user. This participant assessment is depicted in block 2016. For example, a science module may require the user to perform particular scientific experiments and projects to gain greater appreciation of the actual concepts based on the scientific principles taught in the training segments.

Once the users or participants complete their training segments and the questions and activities within a particular module, the system then performs a grading of an evaluation of the questions and forwards the results to the appropriate supervisor of that particular participant for verification, which is illustrated in block 2018. Based on the information gained during the question and activity evaluation periods, the supervisory individual provides individual and critical feedback to the participant for an evaluation of the participant's understanding and areas of weakness and strengths and areas to focus for remedial improvement, if necessary.

Again, each module is designed to include one or more of the following: a pretest, presentation of material, intermediate review tests, final review tests, activity sections, and question and answer sessions. Each element is designed to reinforce the learning experience of the student and to provide on the spot assessment to the student as well as full assessment to the instructor or administrator.

The fields or mapping is performed such that where each stage is to be presented in a time sequential manner, the first in time information is flagged to the first in time sequence of the presentation system. A simple question and answer interrogation of the individual adding the module to the system allows the module designer to insert the contents or map the contents to the system in a quick and easy fashion. In the interrogation method, the system asks which section is to be presented as the overview of the materials to be presented, which section is to be presented as the bulk materials for presentation to the student's or worker's, which materials are to serve as questions of the subject matter to be reviewed, how the questions are to interact with the subject matter, and whether a final test is to be presented.

If the system utilizes a mapping or flag system, then the developer of the module simply adds particular flags within the module to indicate which sections are to be presented when and in what context. For example, the overview section would be presented first and would have the first flag assigned within the system. Next, the contents of the bulk materials to be presented would be flagged. Thirdly, the questions would be inserted with yet another flag. The particular order is not paramount, however, the presentation of the materials is to be performed in such a way as is desired by the developer of the module or the district or company. This presentation is typically in accordance with known teaching methods such as presenting background materials, introductory information, a history of the subject matter, or any of the like, before the actual introduction of the main course to be learned. The presentation can be focused on leadership, classroom strategies, assessment techniques, brain research technology standards, reading and learning, mathematics, ESL (English as a second language), block scheduling and the like.

Further, the teaching methods can include incorporating short check questions to evaluate understanding at any point during the presentation materials in order not to overwhelm the pupil with materials that is too advanced. This would allow the pupil to review the material prior to going on to the next subject, especially when the next subject is based upon the materials currently being reviewed. These questions would be assigned appropriate flags to call them up when the student has completed a section of material associated with the questions.

Not only can the modules be interchanged, but several modules can be implemented within the same system. For example, a preliminary module can be implemented that each and every student must review in order to gain access to any subsequent module. Further, when the teacher has established that there is a set logical order of subject presentation, then the order of the modules are placed appropriately so that foundational material prior is presented before advanced material. As soon as the student masters the foundation material to an acceptable level, the student is then given access to subsequent modules in order to continue the learning process. This allows the student to go at his or her own pace without being overwhelmed by trying to do too much too soon. Further still, this allows the class to move at an accelerated rate with self teaching whether they are able to attend a live lecture given by the teacher or whether attending a business seminar or evaluation session as required for employment purposes or skill improvement purposes.

The advantages of being able to interchange modules allows for various options to be achieved. For example, in a work environment, the human resource directors can send new employees through a training session that evaluates the level of understanding of the particular job skills required of the new employee in a quick and self-directed session for the new employee. If the new employee has insufficient skills for the particular job, but is valued by other considerations important to the organization, then the employee can go through the training seminars on a self-directed basis and show to the human resource department that the employee is gaining the necessary skills to perform the tasks expected thereof. Further still, the human resource department can do evaluations of employees at every level to make sure that their skills are honed and current with the job description expected of each employee. Evaluations of the employees can be performed on a quarterly, semiannual, or yearly basis, or any other time frame deemed suitable by the human resource department. This approach can also be extended into educational settings for teacher evaluations, administration reviews, student assessments, and the like.

With the interchangeability of modules as well as the addition of more than one module within the system for evaluation and participation by the target group, different types of analyses can be performed. One type of analysis is that of assessing the group's understanding of the information. Group assessments are helpful in that they indicate to the instructor whether the subject matter presented is done in too easy or too difficult a fashion for the group as a whole. Another advantage is that the analysis allows the instructor to identify pupils within the group who should be accelerated or should have remedial training sessions presented according to their ability.

Further still, any assessment that is performed on the group typically means that there is an assessment of each of the students within the group. These assessments can be forwarded to the student for evaluation and typically are sent e-mail or through access to a password protected website for the student or can be sent in other conventional ways such as by regular mail. Additionally, the group assessments can be directed to the supervisors of the instructors for evaluation of how effective the instructors have presented their materials and how successful the participants were in mastering the subject matter.

In another exemplary embodiment, the invention may be implemented as a computer program product for use with a computer system. Such implementation may include a series of computer instructions fixed either on a tangible medium, such as a computer readable media (e.g. diskette 142, DVD or CD-ROM 147, ROM 115, or fixed disk 152 as shown in FIG. 3) or transmittable to a computer system, via a modem or other interface device, such as communications adapter 190 connected to the network 195 over a medium 191. Medium 191 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over a network (e.g., the Internet or World Wide Web).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A teaching, evaluation, and reporting computer system for managing at least one instructional segment to be accessed by a user, the computer system comprising:
   means for streaming the instructional segment to the user for review by the user;
   means for evaluating the user's comprehension of the instructional segment;
   means for reporting the user's evaluation results of the instructional segment to an administrator; and
   means for adding an additional instructional segment within the system for streaming, evaluation, and reporting.

2. The invention in accordance with claim 1, further comprising means for granting the user access to the instructional segment.

3. The invention in accordance with claim 1, wherein the streaming means comprises an electronic data communications channel connecting the user with the computer system.

4. The invention in accordance with claim 1, wherein the evaluating means comprises an electronically generated exam taken by the user.

5. The invention in accordance with claim 1, wherein the reporting means comprises a database for organizing, storing and retrieving the results of the evaluation performed by the user.

6. The invention in accordance with claim 1, wherein the reporting means also reports the length of time required by the user to complete the evaluation.

7. The invention in accordance with claim 1, wherein the reporting means also reports the results of the evaluation to the user.

8. The invention in accordance with claim 1, wherein the reporting means also reports whether the user completed the evaluation and how much of the evaluation is completed.

9. The invention in accordance with claim 1, wherein the reporting means reports the instructional segment reviewed by the user.

10. The invention in accordance with claim 1, wherein the reporting means provides a report to the administrator of all users reviewing the instructional segment.

11. The invention in accordance with claim 1, wherein the reporting means provides question verification to other users of questions asked within the evaluation means of the instructional segment.

12. The invention in accordance with claim 11, wherein the reporting means obtains and manages feedback received on the question verification made by the other users.

13. The invention in accordance with claim 1, wherein the reporting means provides user group management to the administrator.

14. The invention in accordance with claim 13, wherein the reporting means provides a report of the users within the user group to the administrator.

15. The invention in accordance with claim 1, wherein the streaming means comprises an internet communications link between the user and the computer system.

16. The invention in accordance with claim 1, wherein the streaming means provides multimedia information to the user in an interactive format.

17. A method for providing a teaching, evaluation, and reporting management program on a computer system for managing at least one instructional segment to be accessed by a user, comprising:
   A streaming the instructional segment to the user for review by the user;
   B evaluating the user's comprehension of the instructional segment;
   C reporting the user's evaluation results of the instructional segment to an administrator; and
   D adding an additional instructional segment for streaming, evaluating, and reporting as in steps A–C.

18. The invention in accordance with claim 17, further comprising, prior to the streaming step, granting the user access to the instructional segment.

19. The invention in accordance with claim 17, wherein the streaming step comprises an electronically communicating data between the user and the computer system.

20. The invention in accordance with claim 17, wherein the evaluating step comprises testing the user via an electronically generated exam.

21. The invention in accordance with claim 17, wherein the reporting step further comprises:
   organizing the results of the evaluation performed by the user;
   storing the results of the evaluation performed by the user; and
   retrieving the results of the evaluation performed by the user so they can be reported to the administrator.

22. The invention in accordance with claim 17 wherein the reporting step further comprises reporting the length of time required by the user to complete the evaluation.

23. The invention in accordance with claim 17 wherein the reporting step also comprises reporting the results of the evaluation to the user.

24. The invention in accordance with claim 17 wherein the reporting step also comprises reporting whether the user completed the evaluation and how much of the evaluation is completed.

25. The invention in accordance with claim 17 wherein the reporting step also comprises reporting the instructional segment reviewed by the user.

26. The invention in accordance with claim 17 wherein the reporting step also comprises providing a report to the administrator of all users reviewing the instructional segment.

27. The invention in accordance with claim 17 wherein the reporting step also comprises verifying questions used within the evaluation step.

28. The invention in accordance with claim 27 wherein the reporting step comprises:
   obtaining and managing feedback received from the question verification step.

29. The invention in accordance with claim 17 wherein the reporting step also comprises providing user group management to the administrator.

30. The invention in accordance with claim 29 wherein the reporting step also comprises generating a report to the administrator of the users within the user group.

31. The invention in accordance with claim 17 wherein the streaming step comprises connecting the user and the computer system via an internet connection.

32. The invention in accordance with claim 17 wherein the streaming step provides multimedia information to the user in an interactive format.

33. A teaching, evaluation, and reporting computer system for managing at least one instructional segment to be accessed by a user, the computer system comprising:
   an instructional segment delivery device capable of streaming the instructional segment to the user for review by the user;
   an evaluation device to evaluate the user's comprehension of the instructional segment;
   an instructional segment management device, coupled to the instructional segment delivery device and the evaluation device, to add other instructional segments, or modify existing instructional segments, for instructional presentation and evaluation review; and
   a report generation and management device capable of reporting the user's evaluation results of the instructional segment to an administrator.

34. The invention in accordance with claim 33 further comprising an access device to grant the user access to the instructional segment.

35. The invention in accordance with claim 33 wherein the instructional segment delivery device comprises an electronic data communications channel connecting the user with the computer system.

36. The invention in accordance with claim 33 wherein the evaluation device comprises an electronically generated exam taken by the user.

37. The invention in accordance with claim 33 wherein the report generation and management device comprises a database for organizing, storing and retrieving the results of the evaluation performed by the user.

38. The invention in accordance with claim 33 wherein the evaluation device provides a pre-assessment evaluation of the subject matter to the user.

39. The invention in accordance with claim 33 wherein the report generation and management device is capable of reporting the results of the evaluation to the user.

* * * * *